(12) United States Patent
Wong

(10) Patent No.: US 10,405,685 B2
(45) Date of Patent: Sep. 10, 2019

(54) FOOD PEELER

(71) Applicant: King's Flair Development Ltd., Hong Kong (HK)

(72) Inventor: Siu Wah Wong, Hong Kong (HK)

(73) Assignee: KING'S FLAIR DEVELOPMENT LTD., Hong Kong (CN)

(*) Notice: Subject to any disclaimer, the term of this patent is extended or adjusted under 35 U.S.C. 154(b) by 112 days.

(21) Appl. No.: 15/001,782

(22) Filed: Jan. 20, 2016

(65) Prior Publication Data
US 2016/0206129 A1 Jul. 21, 2016

Related U.S. Application Data

(60) Provisional application No. 62/105,810, filed on Jan. 21, 2015.

(51) Int. Cl.
*A47J 17/02* (2006.01)

(52) U.S. Cl.
CPC ................................. *A47J 17/02* (2013.01)

(58) Field of Classification Search
CPC ................................. A47J 17/02; A47J 17/04
USPC ....................................... 30/279.2–279.6
See application file for complete search history.

(56) References Cited

U.S. PATENT DOCUMENTS

| | | | | |
|---|---|---|---|---|
| 2,031,191 A | * | 2/1936 | Swedeland | A47J 17/02 30/279.6 |
| 2,121,000 A | * | 6/1938 | Anderson | B26B 21/16 30/40 |
| 3,942,249 A | * | 3/1976 | Poehlmann | B26B 1/046 30/160 |
| 3,956,825 A | * | 5/1976 | Ness | A47J 17/02 30/279.6 |
| 4,083,103 A | * | 4/1978 | Estandian | B26B 21/28 30/47 |
| 4,233,737 A | * | 11/1980 | Poehlmann | B26B 1/042 30/161 |
| 5,093,991 A | * | 3/1992 | Hendrickson | B26B 21/28 30/531 |
| 5,467,498 A | * | 11/1995 | Keegan | A47L 13/08 30/172 |
| 6,619,194 B1 | | 9/2003 | Kuan | |
| 7,065,882 B2 | * | 6/2006 | Haberstroh | A47J 17/02 30/279.6 |

(Continued)

FOREIGN PATENT DOCUMENTS

DE 202011103365 U1 * 8/2011 ............ A47J 17/02
DE 102010028201 A1 10/2011

(Continued)

OTHER PUBLICATIONS

European Patent Office, "Extended European Search Report," issued in connection with European Patent Application No. 16152140.6, dated Jun. 17, 2016, 7 pages.

*Primary Examiner* — Jason Daniel Prone
(74) *Attorney, Agent, or Firm* — Nyemaster Goode P.C.

(57) ABSTRACT

The present invention provides a peeler that is switchable between a T peeler mode wherein the cutting blade is perpendicular to the handle, and an I peeler mode wherein the cutting blade is parallel to the handle. The peeler of the present invention includes a ballpoint pen mechanism for easily actuating the switching between the T peeler mode and the I peeler mode.

11 Claims, 13 Drawing Sheets

(56) References Cited

U.S. PATENT DOCUMENTS

| | | | | |
|---|---|---|---|---|
| 7,185,436 B2* | 3/2007 | Murphy | ............ | A47J 17/02 30/279.6 |
| 7,415,769 B2* | 8/2008 | Hughes | ............ | A47J 17/02 30/279.6 |
| 9,289,088 B2* | 3/2016 | Vitenson | ............ | B26D 3/283 30/142 |
| 9,296,115 B2* | 3/2016 | Wong | ............ | B26B 29/063 30/280 |
| 9,446,530 B2* | 9/2016 | Wong | ............ | B26B 3/03 83/856 |
| 9,516,975 B2* | 12/2016 | Wong | ............ | A47J 42/46 241/101.3 |
| 2005/0028384 A1 | 2/2005 | Hughes | | |
| 2005/0217122 A1 | 10/2005 | Murphy et al. | | |
| 2005/0278957 A1* | 12/2005 | McCullough | ............ | B26B 27/002 30/279.6 |
| 2007/0227013 A1* | 10/2007 | Kaposi | ............ | A47J 17/02 30/279.6 |
| 2013/0047444 A1* | 2/2013 | Ientile | ............ | A47J 17/02 30/280 |
| 2017/0027363 A1* | 2/2017 | Greiner | ............ | A47J 17/02 30/279.2 |

FOREIGN PATENT DOCUMENTS

| | | | | |
|---|---|---|---|---|
| DE | 202010018286 U1 * | 5/2015 | ............ | A47J 17/02 |
| DE | 102010028201 B4 * | 7/2015 | ............ | A47J 17/02 |
| EP | 1683450 A1 * | 7/2006 | ............ | A47J 17/02 |
| EP | 2913164 A1 * | 9/2015 | ............ | B26B 3/03 |
| EP | 3047764 A1 * | 7/2016 | | |
| JP | 2000175808 A | 6/2000 | | |
| WO | WO 2017021665 A1 * | 2/2017 | ............ | A47J 17/02 |

\* cited by examiner

FOOD PEELER

TECHNICAL FIELD OF THE INVENTION

This invention relates generally to a food peeler, and more particularly, to a food peeler that is transformable between a T peeler mode wherein the cutting blade is perpendicular to the handle, and an I peeler mode wherein the cutting blade is parallel to the handle.

BACKGROUND OF THE INVENTION

Currently available are peelers used to remove the outer skin or peel of certain vegetables, often potatoes and carrots, and fruits such as apples, pears. There are generally two types of peelers. One type of peelers are named "T peelers", which comprise a handle and a blade arranged perpendicular to the handle, whereas in the other type of peelers named "I peelers", the blade thereof is arranged parallel to the handle. These two types of peelers are adapted for peeling vegetables or fruits of different shapes, and are favored by different users according to their individual preferences.

Therefore, to satisfy different needs or preferences, both the two types of peelers need to be provided. It would be desirable if these two types of peelers can be combined into one device, such that both costs and storage spaces can be reduced.

SUMMARY OF THE INVENTION

The present invention has a principle object of providing a food peeler that can be transformed between a T peeler mode and an I peeler mode. The present invention also provides a mechanism to enable effortless operation for switching the food peeler between the two modes.

In one embodiment of the present invention, the food peeler essentially comprises a handle having a first end and a second end, a holder rotatably mounted on the first end of the handle for rotation around a rotation axis, a cutting element mounted on the holder, and an actuating assembly configured to actuate the holder to rotate around the rotation axis from a first position where the cutting element is retained at a first angle with respect to the handle to a second position where the cutting element is retained at a second angle with respect to the handle. Preferably, the rotation axis is perpendicular to the handle.

Advantageously, the cutting element is configured to be parallel to the handle where the first angle is 0 degree when the holder is in the first position, and perpendicular to the handle where the second angle is 90 degrees when the holder is in the second position.

In one preferred embodiment of the present invention, the actuating assembly is configured to comprise a ballpoint pen mechanism arranged on or in the handle and configured to actuate the rotation of the holder around the rotation axis, and a button connected to the ballpoint pen mechanism for moving the ballpoint pen mechanism.

In one particular embodiment of the present invention, the ballpoint pen mechanism comprises a sleeve fixed on the first end of the handle and having an axial throughbore extending along the rotation axis, and a push plunger, at least a part of which is received in the throughbore of the sleeve and configured to movably engage with the sleeve, wherein when the push plunger is forced to axially move along the rotation axis towards the holder, the holder is caused to rotate around the rotation axis relative to the handle.

In one embodiment of the present invention, the sleeve comprises a plurality of protrusions formed and arranged evenly in a spaced apart fashion on an inner surface of the throughbore, and the push plunger comprises a plurality of slots formed and arranged evenly in a spaced apart fashion on an outer surface of the push plunger for at least partially receiving the protrusions of the sleeve respectively.

In one embodiment of the present invention, the push plunger comprises a plurality of upwardly extending portions arranged evenly in a spaced apart fashion on the outer surface thereof, each of the upwardly extending portions having a plunger top cam face; and the holder comprises a plurality of downwardly extending portions extending from a bottom surface thereof, each of the downwardly extending portions having a holder bottom cam face; wherein when the push plunger is forced to press against the holder, the plunger top cam faces cooperate with the holder bottom cam faces, causing the holder to rotate around the rotation axis.

In one embodiment of the present invention, a second spring is provided to constantly apply a force to the holder so that the holder tends to move towards the sleeve.

In one embodiment of the present invention, each of the protrusions of the sleeve has a sleeve top cam face cooperating with the holder bottom cam faces, such that the holder is caused to further rotate around the rotation axis when the holder to press against the sleeve by the second spring.

In one embodiment of the present invention, the button is provided at the second end of the handle, and the actuating assembly further comprises a linkage having a distal end fixedly coupled to the button and a proximal end formed as a linkage cam face, the linkage cam face cooperating with a plunger bottom cam face formed on a bottom of the push plunger to drive the axial movement of the push plunger along the rotation axis towards the holder when the button is pressed in a direction towards the push plunger, wherein a first spring coupled to the button is provided to constantly apply a force to the button so that the button tends to move in a direction away from the push plunger.

In one embodiment of the present invention, at least one locking pin is mounted on the sleeve and engages with one of a plurality of locking recesses formed on a bottom surface of the holder to lock the holder in a corresponding one of the first position and the second position.

In one embodiment of the present invention, the locking pin is partially received in a side cylinder formed on a periphery of the sleeve, and is biased by a third spring in a direction towards the holder.

In one embodiment of the present invention, the sleeve comprises a plurality of protrusions alternating with a plurality of troughs, which are formed and arranged in a spaced apart fashion on an inner surface of the throughbore, and the push plunger comprises a plurality of bulges formed and arranged evenly in a spaced apart fashion on an outer surface of the push plunger, the bulges being received in the troughs of the sleeve respectively.

In one embodiment of the present invention, wherein the push plunger comprises a plurality of upwardly extending portions arranged evenly in a spaced apart fashion on the outer surface thereof, each of the upwardly extending portions having a plunger top cam face; and the holder is fixedly coupled to a ratchet member comprising a base plate and a plurality of downwardly extending portions extending circumferentially from the base plate, each of the downwardly extending portions having a ratchet bottom cam face; wherein when the push plunger is forced to press against the ratchet member, the plunger top cam faces cooperate with the ratchet bottom cam faces, causing the ratchet member to rotate around the rotation axis, which in turn drives the holder to rotate around the rotation axis.

In one embodiment of the present invention, a second spring is provided to constantly apply a force to the ratchet member so that the ratchet member together with the holder tend to move towards the sleeve.

In one embodiment of the present invention, each of the protrusions of the sleeve has a sleeve top cam face cooperating with the ratchet bottom cam faces, such that the ratchet member and the holder are caused to further rotate around the rotation axis when the ratchet member is forced to press against the sleeve by the second spring.

In one embodiment of the present invention, the button is provided at the first end of the handle and fixedly connected to the push plunger to result in the axial movement of the push plunger along the rotation axis towards the ratchet member when pressed.

In one embodiment of the present invention, the ratchet member further comprises a central post extending upwardly from the base plate and fixedly coupled to the holder.

In one embodiment of the present invention, the food peeler comprises a housing member fixedly connected to the sleeve, the housing member having a top cover with an aperture formed therethrough for passage of the central post of the ratchet member, wherein the second spring is held by the central post between the top cover of the housing member and the base plate of the ratchet member to constantly apply a force to the ratchet member so that the ratchet member together with the holder tend to move towards the sleeve.

In one embodiment of the present invention, the ballpoint pen mechanism is configured such that the holder rotates by 90 degrees around the rotation axis every time the button is pressed to move the ballpoint pen mechanism.

In one embodiment of the present invention, the actuating assembly is able to rotate the holder to a third position wherein the cutting element is retained at a third angle with respect to the handle.

To have a better understanding of the invention reference is made to the following detailed description of the invention and embodiments thereof in conjunction with the accompanying drawings.

DETAILED DESCRIPTION OF THE INVENTION

While this invention is illustrated and described in preferred embodiments, the food peeler of the present invention may be produced in many different configurations, sizes, forms and materials.

Figure 1:
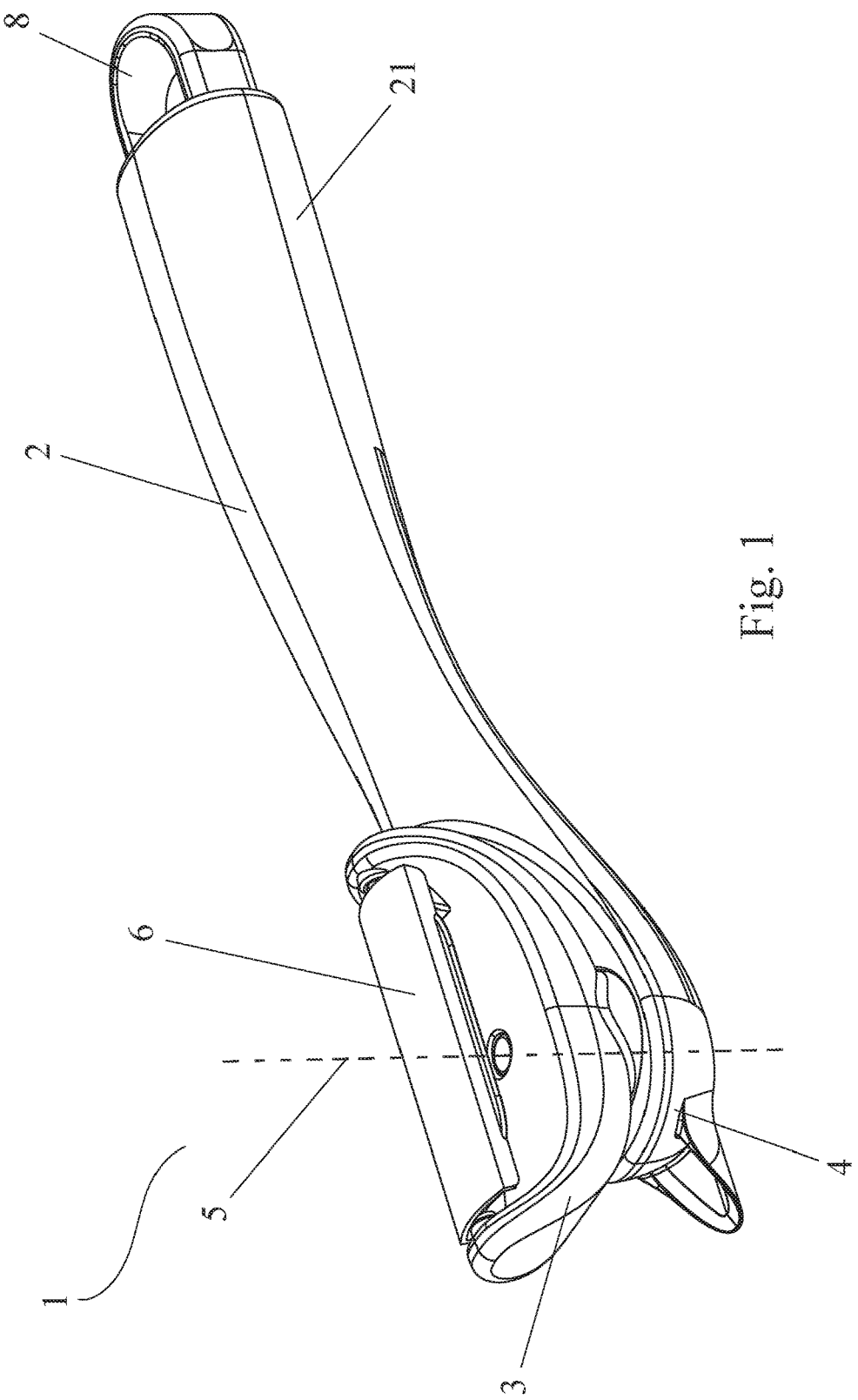
FIG. 1 is a perspective view of a food peeler according to a first embodiment of the present invention in the I peeler mode.
Figure 2:
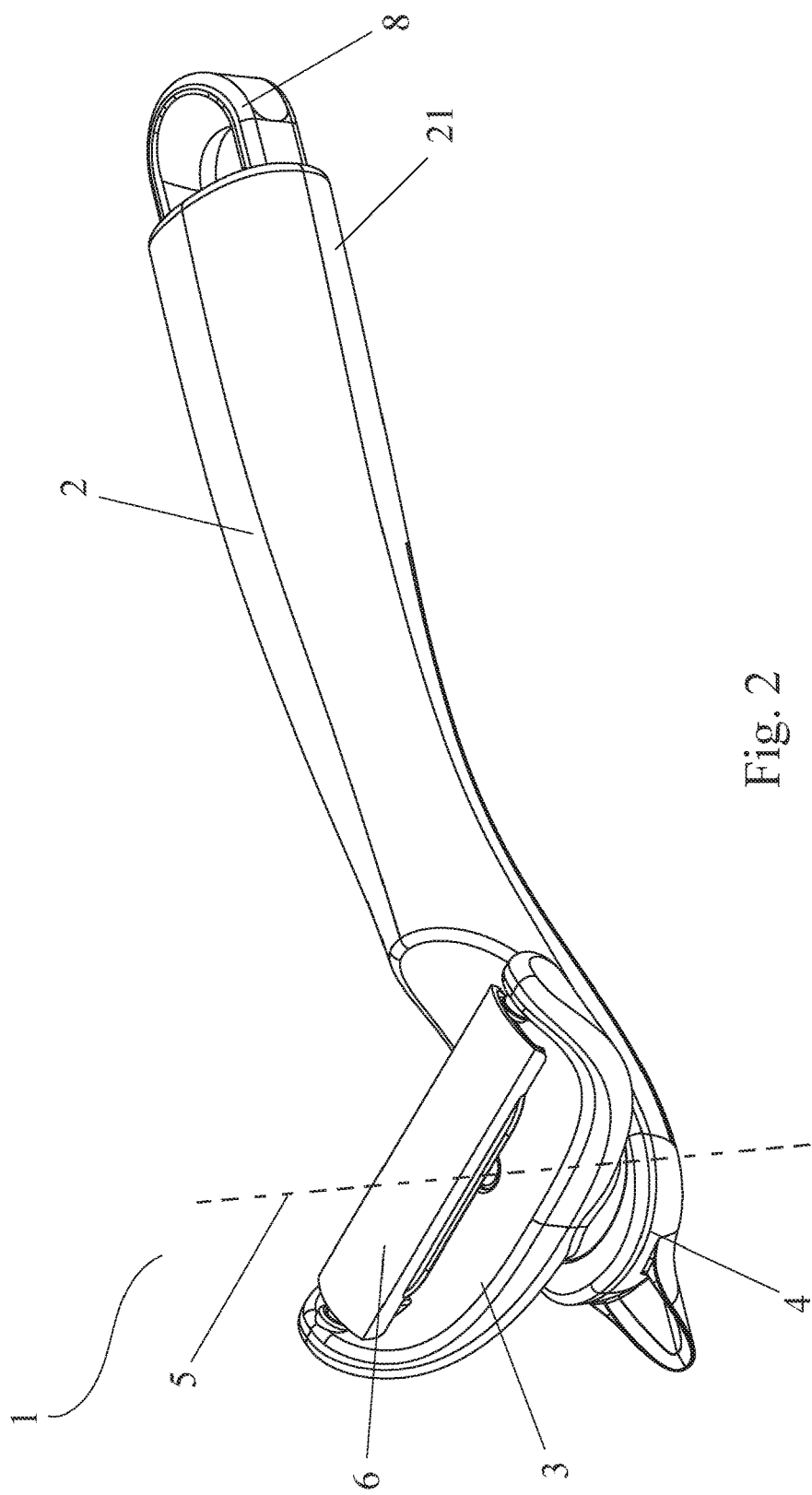
FIG. 2 is a perspective view of the food peeler shown in FIG. 1 in the T peeler mode.

Referring now to the drawings, FIGS. 1 and 2 illustrate in perspective views a food peeler 1 according to a first embodiment of the present invention in the I peeler mode and in the T peeler mode, respectively. This food peeler is adapted for the peel of vegetables and fruits, for example. The food peeler 1 comprises a handle 2 having a first end 4 and a second end 21, a holder 3 rotatably mounted on the first end 4 of the handle 2, and a cutting element 6 mounted on the holder 3. The handle 2 is an elongate and hollow member adapted to be held by a user of the peeler. The holder 3 is configured to be rotatable around a rotation axis 5 relative to the handle 2, and thus the cutting element 6 mounted on the holder 3 is also rotatable around the rotation axis 5. The rotation axis 5 is perpendicular to the length of the handle 2, such that the peeler 1 is transformable by the rotation of the holder 3 around the rotation axis 5, between the I peeler mode wherein the cutting element 6 is parallel to the handle 2, and the T peeler mode wherein the cutting element 6 is perpendicular to the handle 2. The cutting element 6 may be symmetrically or asymmetrically mounted on the holder 3. The cutting element 6 is, for example, a blade with sharp cutting edges and fixedly mounted on the holder 3.

Figure 3:
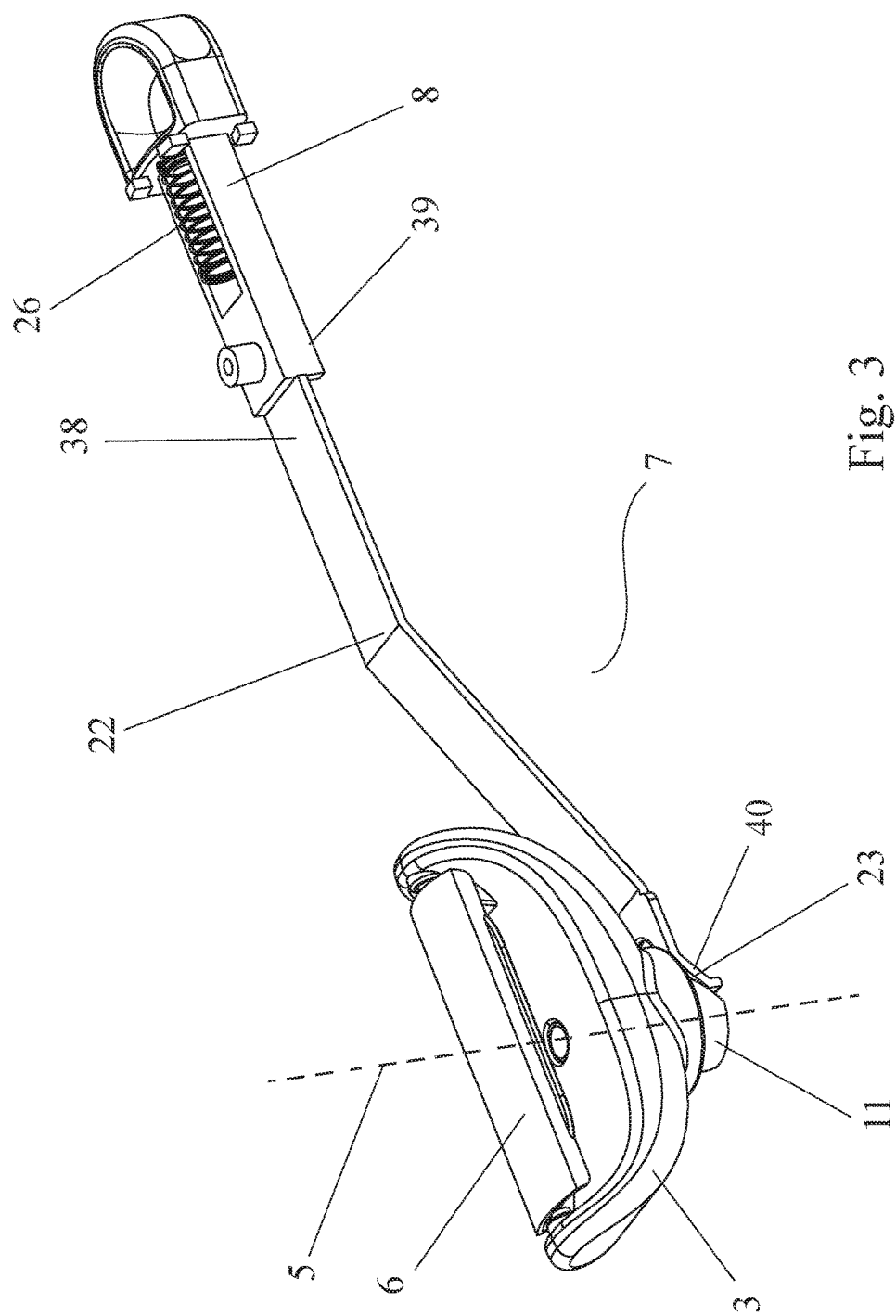
FIG. 3 is a perspective view of the food peeler shown in FIG. 1 with the handle and the sleeve removed.

The rotation of the holder 3 around the rotation axis 5 is actuated by an actuating assembly 7 (see FIG. 3). The actuating assembly 7 comprises a button 8 extending beyond the second end 21 of the handle 2 and a ballpoint pen mechanism which may be moved by the button 8. The actuating assembly 7 is configured in such a manner that when the button 8 is pressed towards the first end 4 of the handle 2 and then released, the holder 3 rotates around the rotation axis 5 by 90 degrees, with the result of the transformation of the peeler 1 from the I peeler mode into the T peeler mode, or from the T peeler mode into the I peeler mode. The detailed structure of the actuating assembly 7 will be explained herein below.

It should be noted that other than the I peeler mode and the T peeler mode, the holder 3 may also be configured to be rotatable to any other position, without departing from the scope of the present invention. In other words, the holder 3 is configured to be rotatable around the rotation axis 5, by the actuating assembly 7, to at least a first position wherein the cutting element 6 is at a first angle with the handle 2, and a second position wherein the cutting element 6 is at a second angle with the handle 2. When the first angle is 0 or 180 degrees, the first position corresponds to the I peeler mode; when the second angle is 90 degrees, the second position corresponds to the T peeler mode.

Figure 4:
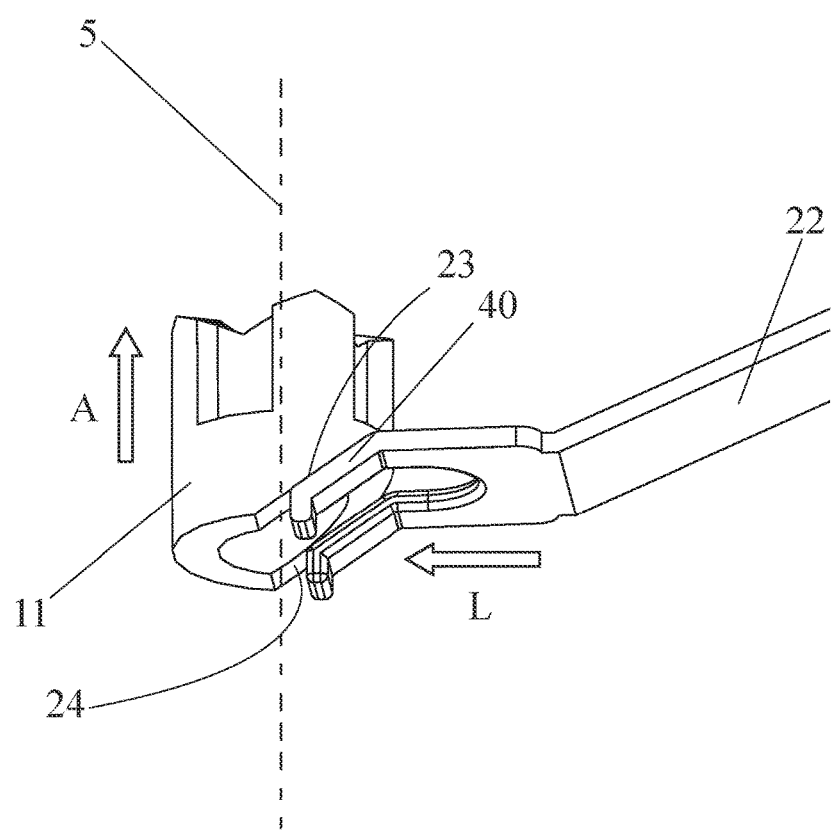
FIG. 4 is a perspective view of the push plunger and the linkage of the food peeler shown in FIG. 1.

FIG. 3 shows in a perspective view the structural components of the actuating assembly 7 which is substantially accommodated in the hollow handle 2 when assembled. As mentioned above, the actuating assembly 7 comprises the button 8 extending from the inside of the handle 2 beyond a second end 21 thereof and the ballpoint pen mechanism. A first spring 26 is provided to constantly apply an outward force to the button 8 (that is, in a direction further away from the first end 4 of the handle 2) to enable the button 8 to move outwardly after the pressure on the button 8 is released. The ballpoint pen mechanism comprises a linkage 22 arranged within the handle 2. The linkage 22 has a distal end 38 fixedly connected to an inner end 39 of the button 8 such that the linkage 22 moves longitudinally within the handle 2 together with the button 8. A proximal end 40 of the linkage, which is opposite to the distal end 38, is formed as a linkage cam face 23 (see FIG. 4). The ballpoint pen mechanism further comprises a push plunger 11 arranged at the first end 4 of the handle 2 in such a manner that the push plunger 11 is movable relative to the handle 2 in a direction perpendicular to the length of the holder 2, that is, along the rotation axis 5. As shown in FIG. 4, a plunger bottom cam face 24 is formed in a bottom portion of the push plunger 11, which cooperates with the linkage cam face 23 of the linkage 22, such that the longitudinal movement (see the arrow L in FIG. 4) of the linkage 22 causes the axial movement (see the arrow A in FIG. 4) of the push plunger 11 along the rotation axis 5.

The cooperation between the components of the ballpoint pen mechanism would result in the axial movement of the push plunger 11, which would then cause the rotation of the holder 3 around the rotation axis 5. The ballpoint pen mechanism further comprises a sleeve 9 (see FIG. 5) extending axially along the rotation axis 5 from the first end 4 of the holder 2. The sleeve 9 is shaped as a hollow cylinder with an axial throughbore 10 extending along the rotation axis 5. Four protrusions 12 are formed and placed evenly in a spaced apart fashion on an inner surface 13 of the sleeve 9. Each of the four protrusions 12 has a sleeve top cam face 20.

Figure 5:
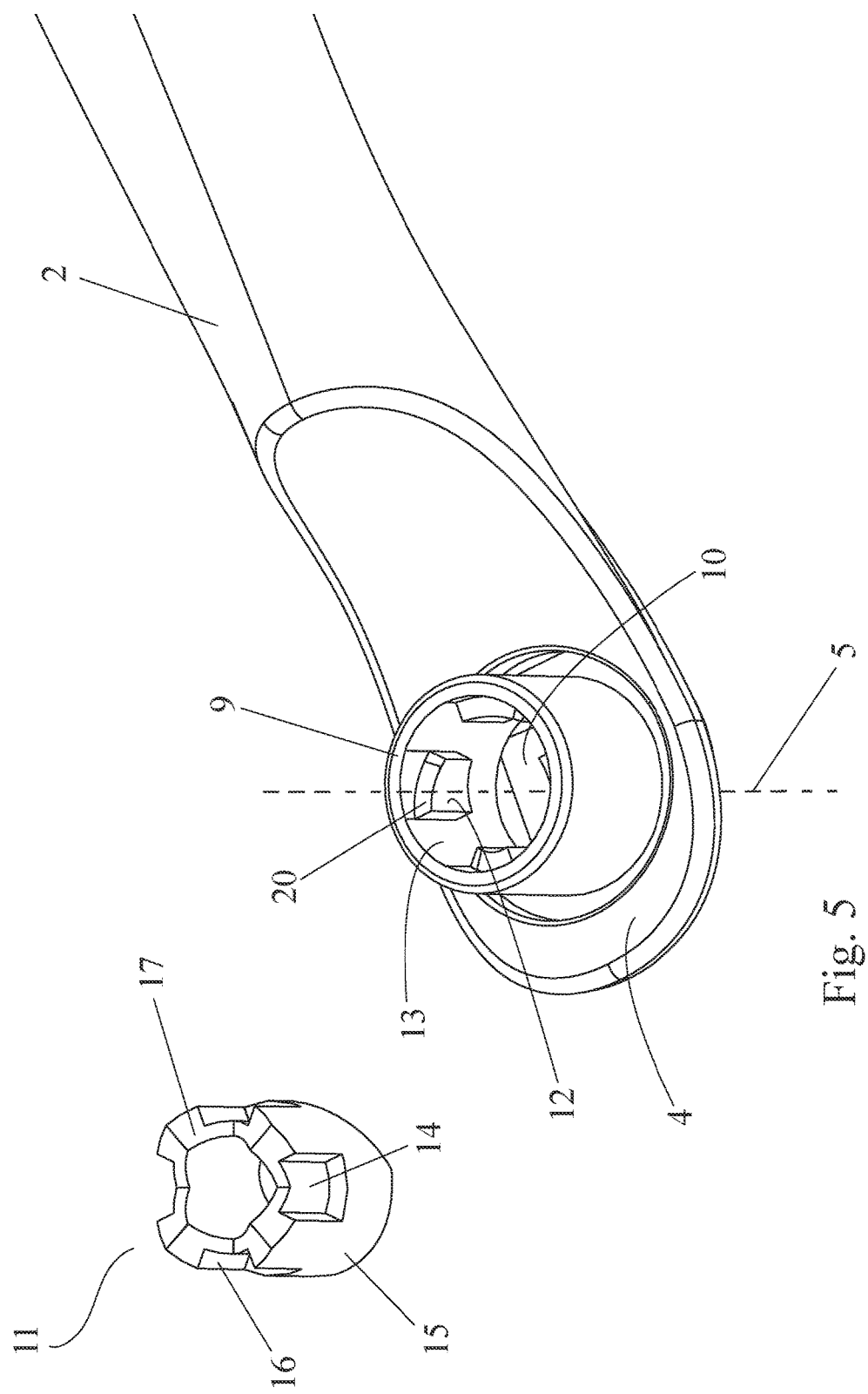
FIG. 5 is a perspective view of the push plunger and the sleeve of the food peeler shown in FIG. 1.
Figure 6:
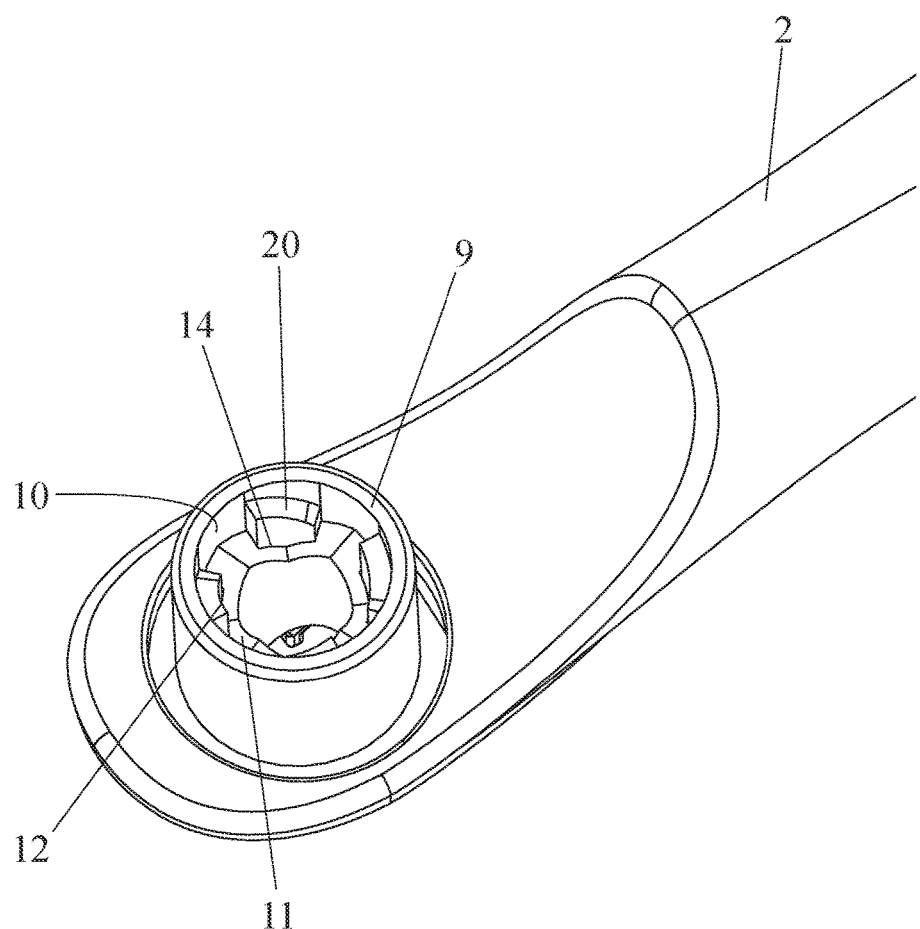
FIG. 6 is a perspective view of the push plunger partially received in the sleeve of the food peeler shown in FIG. 1.
Figure 7A:
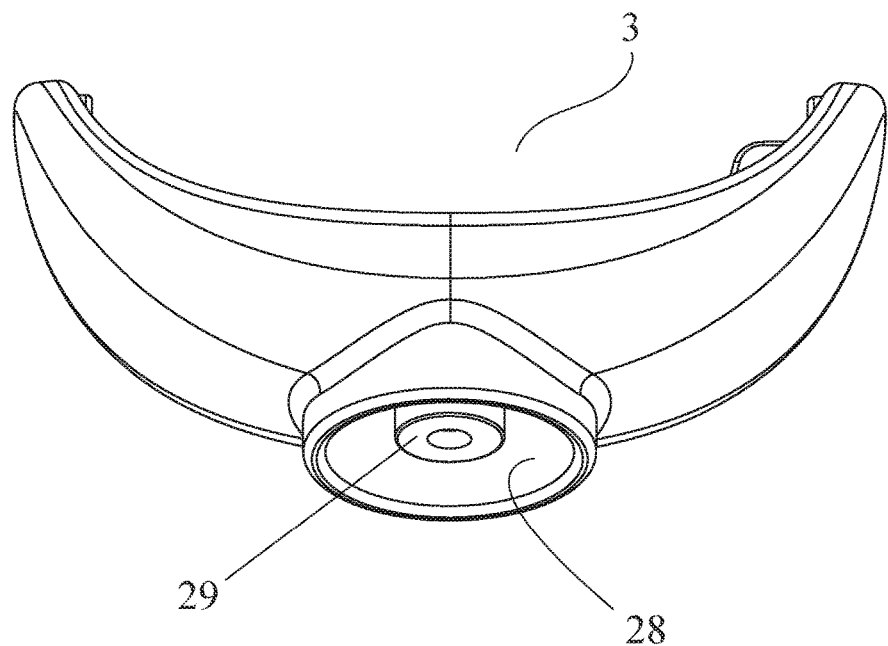
FIG. 7A is a perspective view of the holder of the food peeler shown in FIG. 1.
Figure 7B:
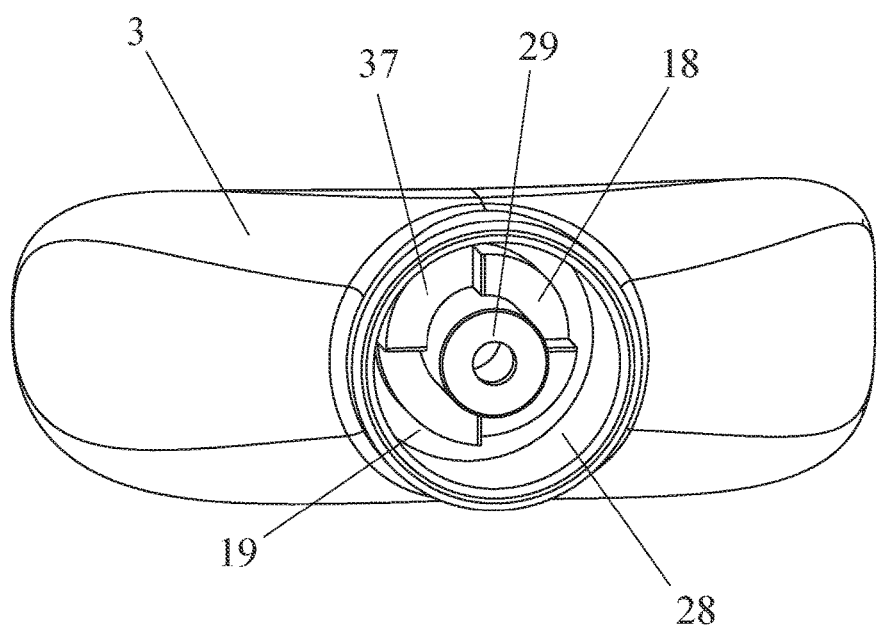
FIG. 7B is a bottom view of the holder shown in FIG. 7A.
Figure 7C:
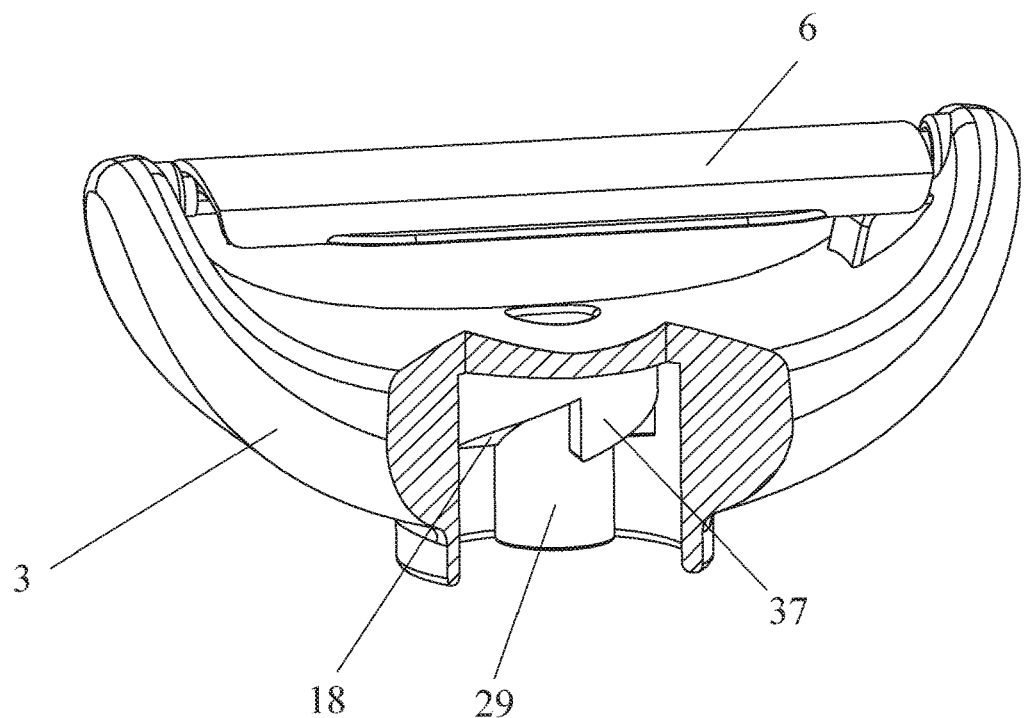
FIG. 7C is a partially broken view of the holder shown in FIG. 7A.
Figure 7D:
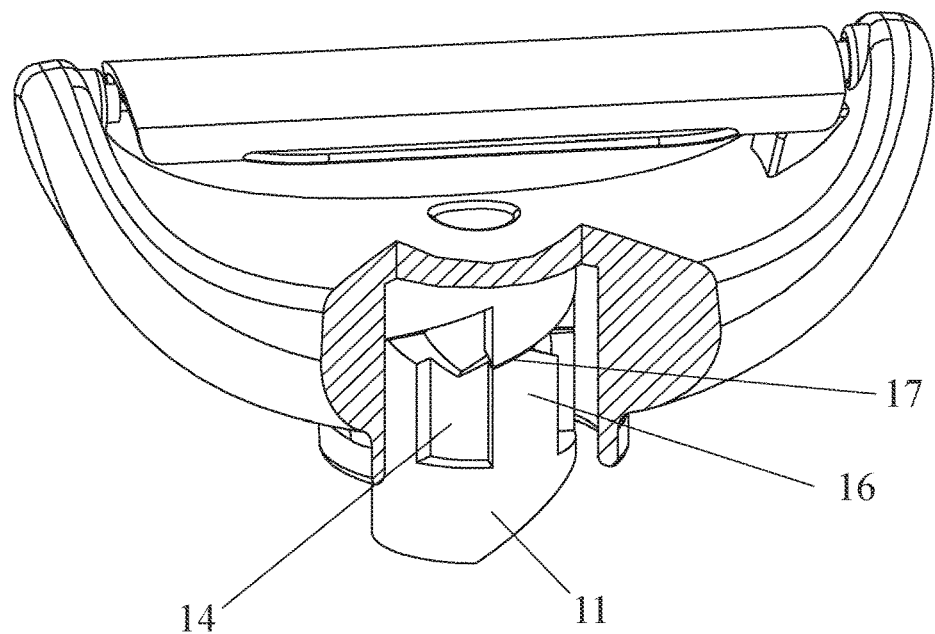
FIG. 7D is a partially broken view of the holder and the push plunger of the food peeler shown in FIG. 1.

As can be seen in FIG. 5, the push plunger 11 is also shaped as a hollow cylinder with four upwardly extending portions 16 arranged evenly in a spaced apart fashion on the circumference of the top of the hollow cylinder. Each of the upwardly extending portions 16 has a plunger top cam face 17. One slot 14 between any two neighboring upwardly extending portions 16 is formed on an outer surface 15 of the push plunger 11. As shown in FIG. 6, the width of the slots 14 is formed to be equal or slightly larger than the width of the respective protrusion 12 of the sleeve for slidably receiving at least part of the respective protrusion 12, such that the push plunger 11 movably engages the sleeve 9. The push plunger 11 is partially received in the throughbore 10 of the sleeve 9, in such a manner that the protrusions 12 of the sleeve 9 are at least partially received in the slots 14 of the push plunger 11, respectively. In other words, the upwardly extending portions 16 of the push plunger 11 and the protrusions 12 of the sleeve 9 are alternately arranged. In this way, the push plunger 11 is axially displaceable relative to the sleeve 9, but non-rotatable relative to the sleeve 9.

As shown in FIGS. 7A-7D, the holder 3 is generally of a truncated T-shape, and a cylindrical cavity 28 extending from an opened bottom of the holder 3 is formed in a lower portion of the holder 3 for accommodating the sleeve 9 and the push plunger 11. In other words, at least a part of the push plunger 11 is accommodated in the sleeve 9, and at least a part of the sleeve 9 is accommodated in the cavity 28 of the holder 3. Four downwardly extending portions 37 evenly extend from a bottom surface 19 of the holder 3 (in other words, a top surface 19 of the cavity 28) in a spaced apart fashion. Each of the downwardly extending portions 37 has a holder bottom cam face 18 which cooperates with each of the four plunger top cam faces 17, causing the holder 3 to rotate around the rotation axis 5 when the push plunger 11 is forced upwardly to press against the holder 3.

Figure 8:
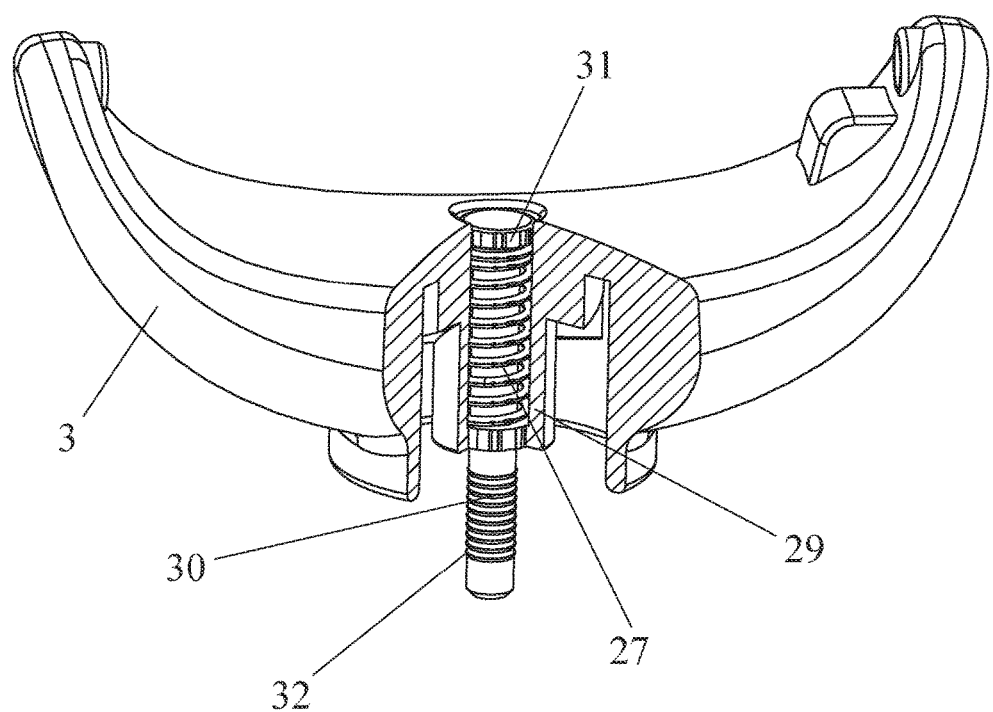
FIG. 8 is a partially broken view of the holder, the second spring and the holding pin of the food peeler shown in FIG. 1.

A hollow inner cylinder 29 extends downwardly from a center of the bottom surface 19 of the holder 3 (that is, the top surface 19 of the cavity 28) and is surrounded by the four downwardly extending portions 37. In a non-operative state, each of the four downwardly extending portions 37 is placed between two neighboring protrusions 12 of the sleeve 9 such that the holder 3 is non-rotatable relative to the sleeve 9. A second spring 27 is provided to constantly apply a downward force (that is, in the direction towards the sleeve 9) to the holder 3. The second spring 27 is accommodated in the hollow inner cylinder 19 and held by a holding pin 30 which is fixedly attached to the handle 2 and which has a top widened end 31 with a larger diameter than that of the second spring 27. The top widened end 31 of the holding pin 30 is used as a stopper of the second spring 27. The other end 32 of the holding pin 30 is threaded and screwed into the handle 2 (see FIG. 8).

When the button 8 is pressed to move inwardly (that is, towards the push plunger 11), the linkage 22 is pushed to move longitudinally towards the push plunger 11. Because of the cooperation between the linkage cam face 23 and the plunger bottom cam face 24, the push plunger 11 is forced by the linkage 22 to move upwardly towards the holder 3, and the plunger top cam faces 17 press against the holder bottom cam faces 18, causing the holder 3 to move upwardly too. When the holder 3 is moved to a position where the four downwardly extending portions 37 disengage from the protrusions 12 of the sleeve 9, namely when the bottoms of the downwardly extending portions 37 are at a level higher than the tops of the protrusions 12, the holder 3 is caused to rotate around the rotation axis 5 due to the cooperating cam faces 17 and 18. When viewed from the top, the holder 3 rotates in the clockwise direction. Then, when the pressure on the button 8 is released, the button 8 is forced by the first spring 26 to move outwardly (that is, in a direction away from the push plunger 11), causing the linkage 22 to move in the same direction with the button 8, with the linkage cam face 23 disengaging from the plunger bottom cam face 24 to allow the push plunger 11 to move downwardly. In the meantime, the second spring 27 forces the holder 3 to move downwardly too, and when the holder bottom cam faces 18 press against the sleeve top cam faces 20, the holder 3 is caused to rotate further in the clockwise direction when viewed from the top, until the highest point of each of the sleeve top cam faces 20 reaches the highest point of each of the holder bottom cam faces 18. In total, the holder rotates by 90 degrees in the clockwise direction when viewed from the top every time the button 8 is pressed and then released. The cutting element 6 such as a blade is mounted on the holder 3 in an orientation parallel to the holder 3. Therefore, every time the button 8 is pressed and then released, the peeler 1 is switched from the T peeler mode into the I peeler mode, or from the I peeler mode into the T peeler mode.

Figure 9:
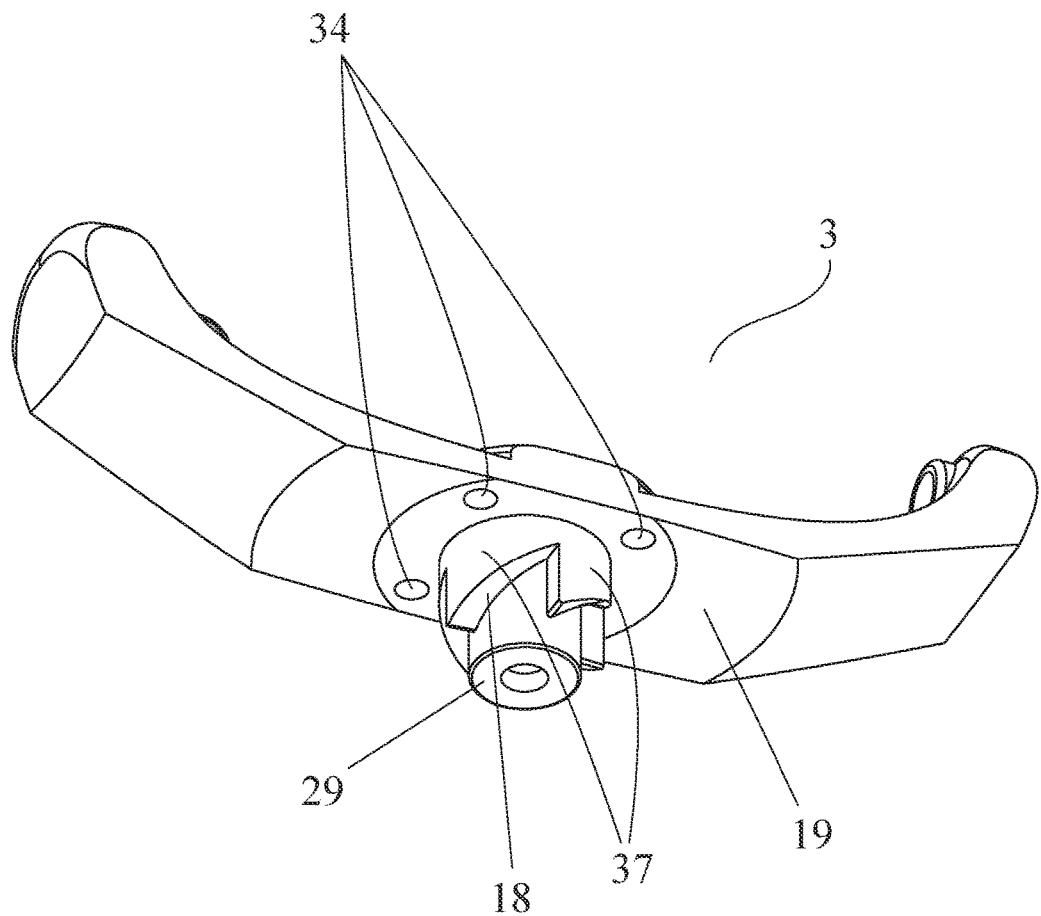
FIG. 9 is a bottom perspective view of the holder of a peeler according to a second embodiment of the present invention.
Figure 10A:
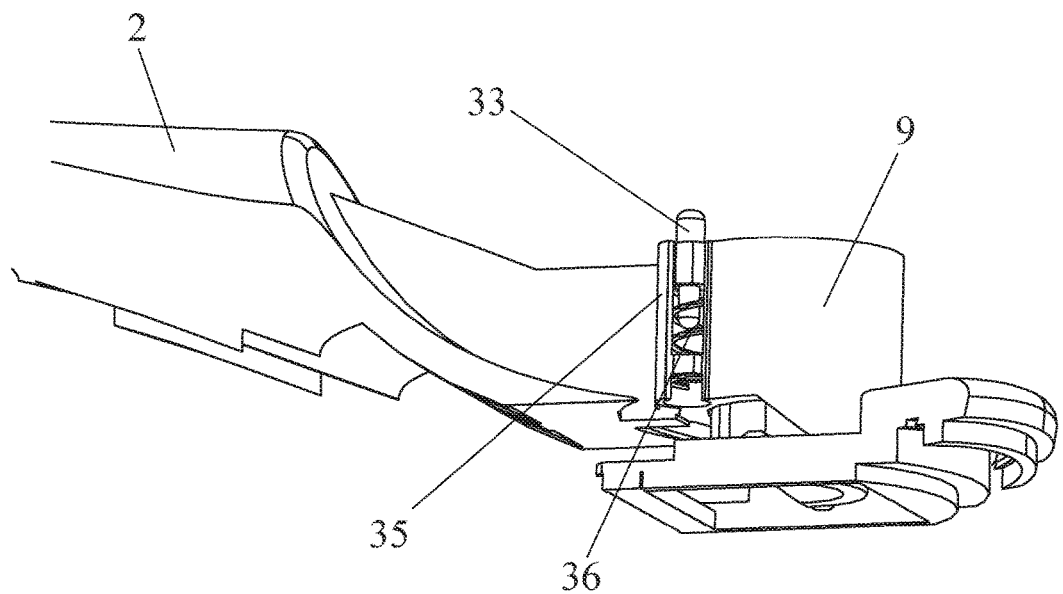
FIG. 10A is a perspective view of the sleeve and the locking pin of the food peeler according to the second embodiment of the present invention.
Figure 10B:
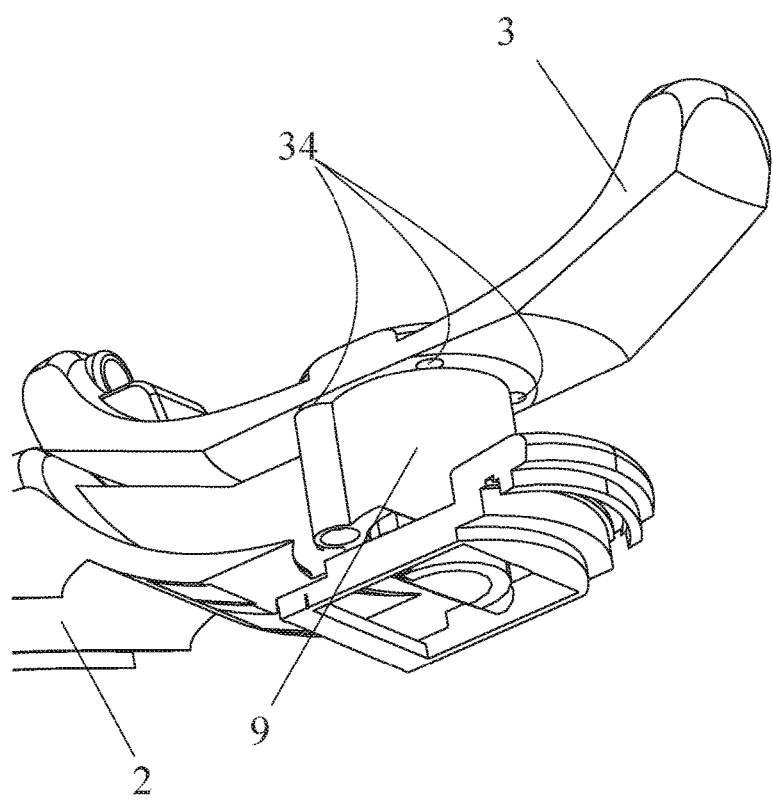
FIG. 10B is a perspective view of the sleeve, the locking pin and the holder of the food peeler according to the second embodiment of the present invention.

Shown in FIGS. 9-10 is a second embodiment of the peeler of the present invention, which is similar to the embodiment described above. The second embodiment differs from the first embodiment discussed above in the elimination of the cylindrical wall enclosing the cavity 28 in the lower portion of the holder 3. In addition, a locking pin 33 is partially received in a side cylinder 35 formed on a periphery of the sleeve 9 and engages with one of four locking recesses 34 formed on the bottom surface 19 of the holder 3, corresponding to the four rotary positions of the holder 3. At two of the positions the peeler 1 is working as a T peeler and at the other two positions the peeler 1 is working as an I peeler. As the holder 3 rotates to move upwardly, the locking recesses 34 are temporarily disengaged from the locking pin 33. When the rotation is completed, the holder 3 is lowered, and one of the recesses 34 is engaged with the locking pin 33, which engagement provides higher stability in the use of the peeler 1. A third spring 36 is provided in the side cylinder 35 to bias the locking pin 33 towards the holder 3.

Figure 11:
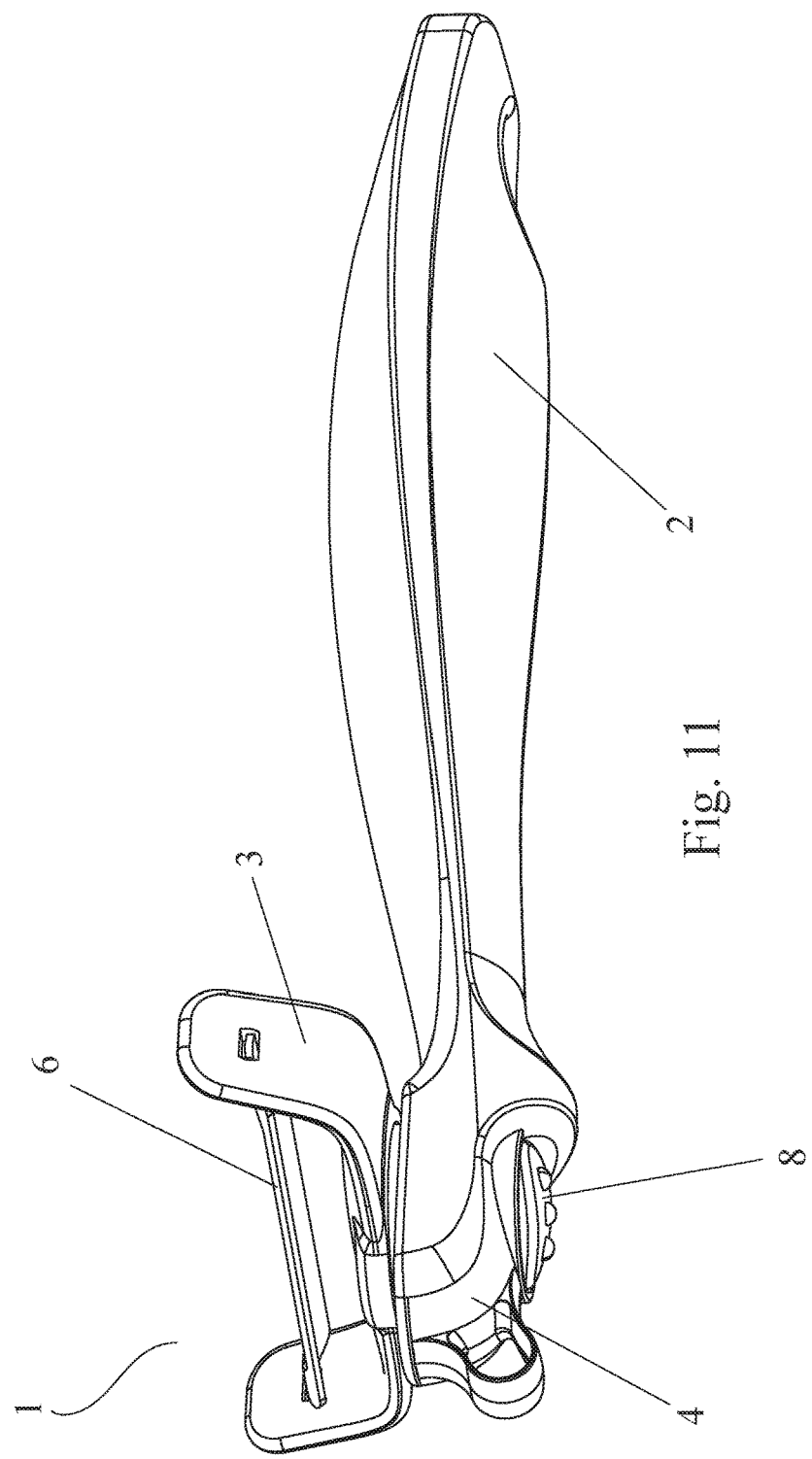
FIG. 11 is a perspective view of a peeler according to a third embodiment of the present invention.
Figure 12:
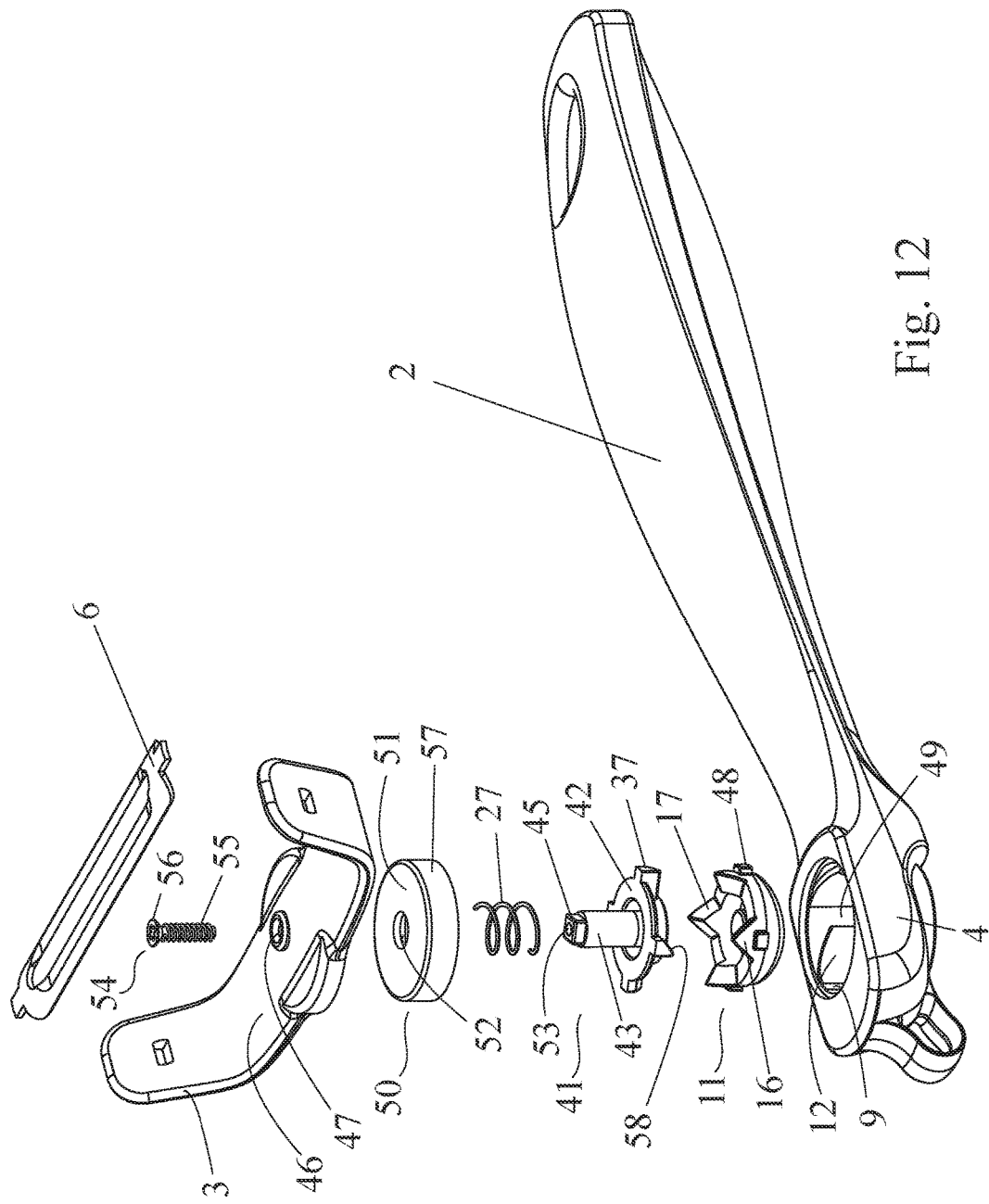
FIG. 12 is an exploded perspective view of the food peeler shown in FIG. 11.

FIGS. 11 and 12 show a third embodiment of the peeler of the present invention, which differs from the first and second embodiments described above in that the button 8 is arranged at the first end 4 of the handle 2, and is adapted to be pressed in a direction along the rotation axis 5. Correspondingly, the linkage 22 and the plunger bottom cam face 24 of the push plunger 11 do not exist in the third embodiment. The button 8 is fixedly and directly connected to the push plunger 11, such that when the button 8 is pressed, the push plunger 11 is driven to move axially along the rotation axis 5 towards the holder 3. Preferably, the button 8 is formed integrally with the push plunger 11. The push plunger 11, the ratchet member 41, and spring 27 together define a ball point pen mechanism. Arranging the button 8 at the same end of the handle 2 as the push plunger 11 simplifies the structure of the peeler 1 by eliminating the linkage 22 and the plunger bottom cam face 24 of the push plunger 11, and the handle 2 does not have to be formed hollow to provide a space for accommodating the linkage 22.

The third embodiment of the peeler of the present invention further differs from the first and second embodiments in that the downwardly extending portions 37 having the bottom cam faces formed thereon are not formed on the bottom surface 19 of the holder 3, but instead are formed on a separate ratchet member 41 (see FIG. 12) which is fixedly connected to the holder 3.

The ratchet member 41 comprises a base plate 42 and a central post 43 extending upwardly from a center of the base plate 42. The four downwardly extending portions 37, each having a ratchet bottom cam face 58, extend downwardly from a periphery of the base plate 42. The central post 43 is substantially shaped cylindrical, with a top portion 45 of the central post 43 having a square cross section, and being received in an orifice 47 formed on a bottom plate 46 of the holder 3. A lower portion (not shown) of the orifice 47 has a square shape corresponding to the square cross section of the top portion 45 of the central post 43, such that the ratchet member 41 is non-rotatable relative to the holder 3. In other words, the rotation of the ratchet member 41 around the rotation axis 5 causes the holder 3 to rotate around the rotation axis 5 together with the ratchet member 41. A fastening hole 53 is drilled on the central post 43, and a fastener 54 is provided to fixedly connect the central post 43 of the ratchet member 41 to the bottom plate 46 of the holder 3. The fastener 54 has a body 55, which extends through the orifice 47 into the fastening hole 53 and is fixedly connected to the central post 43 through the engagement between the body 55 and the fastening hole 53, for example, by threading cooperation therebetween. The fastener 54 further comprises an enlarged top 56 sized to be larger than the size of the orifice 47, such that the holder 3 is fixedly connected to the ratchet member 41, and moves axially along the rotation axis 5 and rotates around the rotation axis 5 together with the ratchet member 41.

The third embodiment differs from the first and second embodiments also in that, instead of providing the protrusions 12 of the sleeve 9 being received in the slots 14 of the push plunger 11, four bulges 48 are formed and arranged evenly in a spaced apart fashion on the outer surface 15 of the push plunger 11, and are received in four troughs 49, respectively, defined by the four protrusions 12 of the sleeve 9. It can be seen in FIG. 12 that the protrusions 12 in the third embodiment are formed much wider than in the first and second embodiments in order to define the troughs 49. Furthermore, in the third embodiment, four upwardly extending portions 16, each having two plunger top cam faces 17, are formed and arranged evenly in a spaced apart fashion on the circumference of the top of the push plunger 11. Therefore, at any given time, only four of the eight plunger top cam faces 17 are cooperating with the four ratchet bottom cam faces 58.

The peeler 1 according to the third embodiment of the present invention further comprises a housing member 50 fixedly connected to a top end of the sleeve 9, that is, the end of the sleeve 9 facing the holder 3. The housing member 50 comprises a cylindrical wall 57 and a top cover 51. An aperture 52 extends through the top cover 51 for the central post 43 of the ratchet member 41 to extend through. The second spring 27 is coiled around the central post 43 between the top cover 51 of the housing member 50 and the base plate 42 of the ratchet member 41. As the housing member 50 is fixedly connected to the sleeve 9, the second spring 27 serves to constantly apply a downward force to the ratchet member 41, that is, biasing the ratchet member 41 towards the sleeve 9. The housing member 50 can be fixedly connected to the sleeve 9 in any manner known in the art, or formed integrally with the sleeve 9.

While the present invention is described in connection with what are presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

NUMERICAL REFERENCES 1 peeler
2 handle
3 holder
4 first end of handle
5 rotation axis
6 cutting element
7 actuating mechanism
8 button
9 sleeve
10 throughbore
11 push plunger
12 protrusion
13 inner surface of sleeve 14 slot
15 outer surface of push plunger
16 upwardly extending portion
17 plunger top cam face
18 holder bottom cam face
19 bottom surface of holder
20 sleeve top cam face
21 second end of handle
22 linkage
23 linkage cam face
24 plunger bottom cam face
26 first spring
27 second spring
28 cavity
29 hollow inner cylinder
30 holding pin
31 widened end of holding pin
32 threaded end of holding pin
33 locking pin
34 locking recess
35 side cylinder
36 third spring
37 downwardly extending portion
38 distal end of linkage
39 inner end of button
40 proximal end of linkage
41 ratchet member
42 base plate
43 central post
45 top portion of central post
46 bottom plate of holder
47 orifice
48 bulge
49 trough
50 housing member
51 top cover of housing member
52 aperture
53 fastening hole
54 fastener
55 body of fastener
56 enlarged top of fastener
57 cylindrical wall
58 ratchet bottom cam face

What is claimed is:

1. A food peeler comprising:
a handle having a first end and a second end;
a through bore sleeve defined in the first end of the handle;
a button on the first end of the handle and in communication with the sleeve;
a ball point mechanism having a rotating part and a push plunger both movably received in the sleeve, the push plunger is in operable engagement with rotating part and is in operable engagement with the button;
a holder connected to the rotating part;
a cutting element mouted to the holder; and
wherein pressing the button moves the push plunger which in turn rotates the rotating part which rotates the holder therewith between a first position where the cutting element is at a first angle with respect to the handle and a second position where the cutting element is at a second angle with respect to the handle that differs from the first angle.

2. The food peeler of claim 1, when the cutting element is at the first angle, the cutting element is parallel to the handle and when the cutting element is at the second angle, the cutting element is perpendicular to the handle.

3. The food peeler of claim 1, the rotating part and the push plunger of the ball point pen mechanism are configured such that the holder rotates by 90 degrees every time the button is pressed.

4. The food peeler of claim 1, the holder rotates to a third position where the cutting element is at a third angle with respect to the handle that differs from the first and second angles.

5. The food peeler of claim 1, wherein the sleeve comprises a plurality of protrusions alternating with a plurality of troughs, which are formed and arranged on an inner surface of the throughbore, and the push plunger comprises a plurality of bulges formed and arranged evenly in a spaced apart fashion on an outer surface of the push plunger, the bulges being received in the troughs of the sleeve respectively.

6. The food peeler of claim 5, wherein the push plunger comprises a plurality of outwardly extending portions arranged evenly in a spaced apart fashion on an outer surface thereof, each of the outwardly extending portions having a plunger cam face; the rotating part is a ratchet member, the ratchet member having a base plate and a plurality of inwardly extending portions extending circumferentially from the base plate, each of the inwardly extending portions having a ratchet bottom cam face; wherein when the push plunger is moved via the button, the plunger cam faces cooperate with the ratchet cam faces thereby causing the ratchet member to rotate, which in turn rotates the holder and cutting element.

7. The food peeler of claim 6, the ball point pen mechanism further comprises a spring to constantly apply a force to the ratchet member so that the ratchet member together with the holder move towards the sleeve.

8. The food peeler of claim 7, wherein each of the protrusions of the sleeve have a sleeve top cam face cooperating with the ratchet cam faces, such that the ratchet member and the holder are caused to further rotate when the ratchet member is forced to press against the sleeve by the spring.

9. The food peeler of claim 8, the button is fixedly connected to the push plunger to define the operable engagement.

10. The food peeler of claim 9, wherein the ratchet member further comprises a central post extending from the base plate, fixedly coupled to the holder, and received by the spring.

11. The food peeler of claim 10, comprising a housing member connected in the sleeve, the housing member having an aperture formed therethrough for passage of the central post of the ratchet member, wherein the spring is held by the central post between the housing member and the base plate of the ratchet member to constantly apply a force to the ratchet member so that the ratchet member together with the holder move towards the sleeve.

* * * * *